(12) United States Patent
Wilson et al.

(10) Patent No.: US 9,275,655 B2
(45) Date of Patent: Mar. 1, 2016

(54) TIMING ERROR DETECTOR WITH DIVERSITY LOOP DETECTOR DECISION FEEDBACK

(71) Applicant: LSI Corporation, San Jose, CA (US)

(72) Inventors: Bruce Wilson, San Jose, CA (US); Yang Han, Sunnyvale, CA (US); Yu Kou, San Jose, CA (US); Rui Cao, Milpitas, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/941,464

(22) Filed: Jul. 13, 2013

(65) Prior Publication Data

US 2014/0362463 A1  Dec. 11, 2014

Related U.S. Application Data

(60) Provisional application No. 61/833,693, filed on Jun. 11, 2013.

(51) Int. Cl.
  *G11B 20/14* (2006.01)
  *G11B 5/09* (2006.01)
  *G11B 20/10* (2006.01)

(52) U.S. Cl.
  CPC ............ *G11B 5/09* (2013.01); *G11B 20/10222* (2013.01); *G11B 20/10009* (2013.01); *G11B 20/10046* (2013.01); *G11B 20/1403* (2013.01); *G11B 2220/2516* (2013.01)

(58) Field of Classification Search
  CPC .................. G11B 20/10009; G11B 2220/2516; G11B 20/10046; G11B 20/10222; G11B 20/1403; G11B 2020/1287; G11B 5/59688; G11B 20/10203; G11B 5/09; G11B 5/6029; G11B 20/10037; G11B 5/59627; G11B 20/1217; G11B 5/59661; G11B 2020/12
  See application file for complete search history.

(56) References Cited

U.S. PATENT DOCUMENTS

| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |

(Continued)

FOREIGN PATENT DOCUMENTS

| FR | 2904168 A1 | 1/2008 |
| WO | WO 03/047091 | 6/2003 |
| WO | WO 2008/009620 | 1/2008 |

OTHER PUBLICATIONS

U.S. Appl. No. 13/529,572, filed Jun. 21, 2012, Yang et al.

(Continued)

*Primary Examiner* — Ross Varndell (57) ABSTRACT

Aspects of the disclosure pertain to an apparatus for detecting timing errors including an analog to digital converter circuit, a diversity loop detector and a timing error calculation circuit. The analog to digital converter circuit is operable to convert an input signal into a series of digital samples. The diversity loop detector is operable to apply a data detection algorithm to a plurality of signals derived from the series of digital samples at different phase offsets, to select one of the phase offsets, and to yield a detected output with the selected phase offset. The timing error calculation circuit is operable to calculate a timing error of the analog to digital converter circuit based at least in part on the selected phase offset.

20 Claims, 4 Drawing Sheets

(56) References Cited

U.S. PATENT DOCUMENTS

| | | | |
|---|---|---|---|
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |
| 5,768,044 A | 6/1998 | Hetzler | |
| 5,781,129 A | 7/1998 | Schwartz et al. | |
| 5,798,885 A | 8/1998 | Saiki et al. | |
| 5,835,295 A | 11/1998 | Behrens | |
| 5,844,920 A * | 12/1998 | Zook et al. | 714/769 |
| 5,852,524 A | 12/1998 | Glover et al. | |
| 5,892,632 A * | 4/1999 | Behrens et al. | 360/51 |
| 5,955,783 A | 9/1999 | Ben-Efraim | |
| 5,970,104 A | 10/1999 | Zhong et al. | |
| 5,986,830 A | 11/1999 | Hein | |
| 5,987,562 A | 11/1999 | Glover | |
| 6,009,549 A * | 12/1999 | Bliss et al. | 714/769 |
| 6,023,383 A | 2/2000 | Glover et al. | |
| 6,069,583 A | 5/2000 | Silvestrin et al. | |
| 6,081,397 A | 6/2000 | Belser | |
| 6,111,712 A | 8/2000 | Vishakhadatta et al. | |
| 6,208,478 B1 | 3/2001 | Chiu et al. | |
| 6,269,058 B1 | 7/2001 | Yamanoi et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,476,989 B1 | 11/2002 | Chainer | |
| 6,490,110 B2 | 12/2002 | Reed et al. | |
| 6,493,162 B1 | 12/2002 | Fredrickson | |
| 6,519,102 B1 | 2/2003 | Smith et al. | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 * | 11/2003 | Tuttle et al. | 360/46 |
| 6,657,802 B1 | 12/2003 | Ashley et al. | |
| 6,671,404 B1 | 12/2003 | Kawatani | |
| 6,717,764 B2 | 4/2004 | Lake | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 * | 2/2005 | Annampedu | 327/159 |
| 6,865,040 B2 | 3/2005 | Fayeulle et al. | |
| 6,876,511 B2 | 4/2005 | Koyanagi | |
| 6,906,990 B2 | 6/2005 | Nagata et al. | |
| 6,912,099 B2 | 6/2005 | Annampedu et al. | |
| 6,963,521 B2 | 11/2005 | Hayashi | |
| 6,980,382 B2 | 12/2005 | Hirano et al. | |
| 6,999,257 B2 | 2/2006 | Takeo | |
| 6,999,264 B2 | 2/2006 | Ehrlich | |
| 6,999,404 B2 | 2/2006 | Furumiya et al. | |
| 7,002,767 B2 | 2/2006 | Annampedu et al. | |
| 7,016,131 B2 | 3/2006 | Liu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,133,227 B2 | 11/2006 | Chiang | |
| 7,136,250 B1 | 11/2006 | Wu et al. | |
| 7,154,689 B1 | 12/2006 | Shepherd et al. | |
| 7,158,464 B2 | 1/2007 | Gushima et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,203,015 B2 | 4/2007 | Sakai et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,362,536 B1 | 4/2008 | Liu et al. | |
| 7,375,918 B1 | 5/2008 | Shepherd et al. | |
| 7,394,608 B2 | 7/2008 | Eleftheriou | |
| 7,411,531 B2 | 8/2008 | Aziz et al. | |
| 7,420,498 B2 | 9/2008 | Barrenscheen | |
| 7,423,827 B2 | 9/2008 | Neville | |
| 7,446,690 B2 | 11/2008 | Kao | |
| 7,525,460 B1 | 4/2009 | Liu et al. | |
| 7,529,320 B2 | 5/2009 | Byrne et al. | |
| 7,558,177 B2 | 7/2009 | Ogura et al. | |
| 7,602,567 B2 | 10/2009 | Park | |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 7,643,235 B2 | 1/2010 | Erden et al. | |
| 7,656,982 B2 | 2/2010 | Gaedke | |
| 7,663,831 B2 | 2/2010 | Hayashi et al. | |
| 7,679,850 B2 | 3/2010 | Smith | |
| 7,693,243 B2 | 4/2010 | Chen et al. | |
| 7,738,200 B2 | 6/2010 | Annampedu | |
| 7,768,437 B2 | 8/2010 | Annampedu | |
| 7,768,730 B2 * | 8/2010 | Bliss et al. | 360/32 |
| 7,796,480 B2 | 9/2010 | Cheng et al. | |
| 7,813,065 B2 | 10/2010 | Annampedu | |
| 7,821,730 B2 | 10/2010 | Cao | |
| 7,835,104 B2 | 11/2010 | Yamashita | |
| 7,889,823 B2 | 2/2011 | Yang | |
| 7,929,237 B2 | 4/2011 | Grundvig | |
| 8,014,099 B2 | 9/2011 | Mathew | |
| 8,054,573 B2 | 11/2011 | Mathew | |
| 8,054,931 B2 | 11/2011 | Annampedu | |
| 8,059,349 B2 | 11/2011 | Annampedu | |
| 8,098,451 B2 | 1/2012 | Graef | |
| 8,102,960 B2 | 1/2012 | Ran et al. | |
| 8,107,573 B2 | 1/2012 | Chang | |
| 8,154,818 B2 | 4/2012 | Mathew | |
| 8,154,972 B2 | 4/2012 | Ratnakar Aravind | |
| 8,169,726 B2 | 5/2012 | Wilson | |
| 8,174,784 B2 | 5/2012 | Grundvig | |
| 8,174,949 B2 | 5/2012 | Ratnakar Aravind | |
| 8,237,597 B2 | 8/2012 | Liu | |
| 8,243,381 B2 | 8/2012 | Annampedu | |
| 8,254,049 B2 | 8/2012 | Annampedu | |
| 8,261,171 B2 | 9/2012 | Annampedu | |
| 2002/0150179 A1 | 10/2002 | Leis et al. | |
| 2005/0243455 A1 | 11/2005 | Annampedu | |
| 2007/0104300 A1 | 5/2007 | Esumi et al. | |
| 2007/0192666 A1 * | 8/2007 | Song et al. | 714/780 |
| 2008/0056403 A1 | 3/2008 | Wilson | |
| 2009/0142620 A1 | 6/2009 | Yamamoto et al. | |
| 2009/0274247 A1 | 11/2009 | Galbraith et al. | |
| 2010/0061490 A1 | 3/2010 | Noeldner | |
| 2010/0067628 A1 | 3/2010 | Buehner | |
| 2010/0142078 A1 | 6/2010 | Annampedu | |
| 2011/0043938 A1 | 2/2011 | Mathew | |
| 2011/0157737 A1 | 6/2011 | Grundvig | |
| 2011/0209026 A1 | 8/2011 | Xia | |
| 2012/0036173 A1 | 2/2012 | Annampedu | |
| 2012/0084336 A1 | 4/2012 | Yang | |
| 2012/0087035 A1 | 4/2012 | Graef | |
| 2012/0106607 A1 | 5/2012 | Miladinovic | |
| 2012/0120784 A1 | 5/2012 | Yang | |
| 2012/0124241 A1 | 5/2012 | Yang | |
| 2012/0134042 A1 | 5/2012 | Annampedu | |

(56) References Cited

U.S. PATENT DOCUMENTS

| | | |
|---|---|---|
| 2012/0134043 A1 | 5/2012 | Annampedu |
| 2012/0155587 A1 | 6/2012 | Annampedu |
| 2012/0182643 A1 | 7/2012 | Zhang |
| 2012/0236428 A1* | 9/2012 | Xia et al. .................. 360/32 |

OTHER PUBLICATIONS

Annampedu, V. et al "Adaptive Algorithms for Asynchronous Detection of Coded Servo Signals Based on Interpolation", IEEE Transactions on Magnetics, vol. 41, No. 10, Oct. 2005.

Aziz et al., "Asynchronous Maximum Likelihood (ML) Detection of Servo Repeatable Run Out (RRO) Data", Digest, IEEE Intl Mag Conf, vol. 42, No. 10, pp. 2585-2587 (Oct. 2006).

Aziz et al., "Interpolation Based Maximum-Likelihood(ML) Detection of Asynchronous Servo Repeatable Run Out (RRO) Data" IEEE Intl Mag Conf. vol. 42 No. 10 pp. 2585-2587, Oct. 2006.

Hagenauer et al., "A Viterbi algorithm with soft-decision outputs and its applications," in Proc. IEEE Global Telecom Conf 1989, Dallas, Texas, pp. 1680-1686 (Nov. 1989).

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

U.S. Appl. No. 13/777,937, filed Feb. 26, 2013, Rui Cao, Unpublished.

U.S. Appl. No. 13/491,135, filed Jun. 7, 2012, Xun Zhang, Unpublished.

U.S. Appl. No. 13/490,913, filed Jun. 7, 2012, Xun Zhang, Unpublished.

U.S. Appl. No. 13/242,983, filed Sep. 23, 2011, Jeffrey P. Grundvig, Unpublished.

U.S. Appl. No. 13/186,267, filed Jul. 19, 2011, Haitao Xia, Unpublished.

U.S. Appl. No. 13/173,088, filed Jun. 30, 2011, Jeffrey P. Grundvig, Unpublished.

U.S. Appl. No. 13/096,873, filed Apr. 28, 2011, Ross S. Wilson, Unpublished.

U.S. Appl. No. 13/100,021, filed May 3, 2011, Haitao Xia, Unpublished.

Weller et al "Thermal Limits in Ultrahigh-density Magnetic Recording" IEEE Trans. Magn. vol. 35, No. 6, p. 4423, Nov. 1999.

* cited by examiner

TIMING ERROR DETECTOR WITH DIVERSITY LOOP DETECTOR DECISION FEEDBACK

CROSS REFERENCE TO RELATED APPLICATIONS

The present application claims priority to (is a non-provisional of) U.S. Pat. App. No. 61/833,693, entitled "Timing Error Detector with Diversity Loop Detector Decision Feedback", and filed Jun. 11, 2013 by Wilson et al, the entirety of which is incorporated herein by reference for all purposes.

FIELD OF THE INVENTION

Various embodiments of the present invention provide systems and methods for detecting timing errors.

BACKGROUND

Some data processing systems that receive stored or transmitted electronic data use sampling circuits to generate a digital representation of the electronic data. To assist the data processing system to sample the electronic data at the correct frequency and phase. A timing error detector determines when the sampling is performed at an incorrect frequency or phase. In some instances, a preamble pattern is inserted into the electronic data, enabling the timing error detection. However, after the preamble pattern has ended, timing errors can reoccur due to intrinsic timing drift in the system, characteristics of the storage or transmission medium, and the environment of the data processing system.

BRIEF SUMMARY

Embodiments of the present invention provide systems and methods for detecting timing errors with decision feedback from a diversity loop detector.

In some embodiments, an apparatus for detecting timing errors includes an analog to digital converter circuit, a diversity loop detector and a timing error calculation circuit. The analog to digital converter circuit is operable to convert an input signal into a series of digital samples. The diversity loop detector is operable to apply a data detection algorithm to a plurality of signals derived from the series of digital samples at different phase offsets, to select one of the phase offsets, and to yield a detected output with the selected phase offset. The timing error calculation circuit is operable to calculate a timing error of the analog to digital converter circuit based at least in part on the selected phase offset.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

A timing error detector is disclosed which provides an accurate and stable timing error estimation, driving a timing recovery loop. The timing error detector uses decision feedback from a diversity loop detector to apply one of a number of phase correction terms. The diversity loop detector performs a data detection algorithm to each of a number of phase shifted versions of a channel input. Based on the results of the data detection algorithms, one of the phase shifted results that yields the best detection results is selected, and the phase offset of the selected phase shifted version of the channel input is applied in the timing error detector. The process is performed either continuously or periodically, and as timing errors change, the diversity loop detector will select different phase shifted versions of the channel input and the phase offset is changed by the timing error detector.

Figure 1:
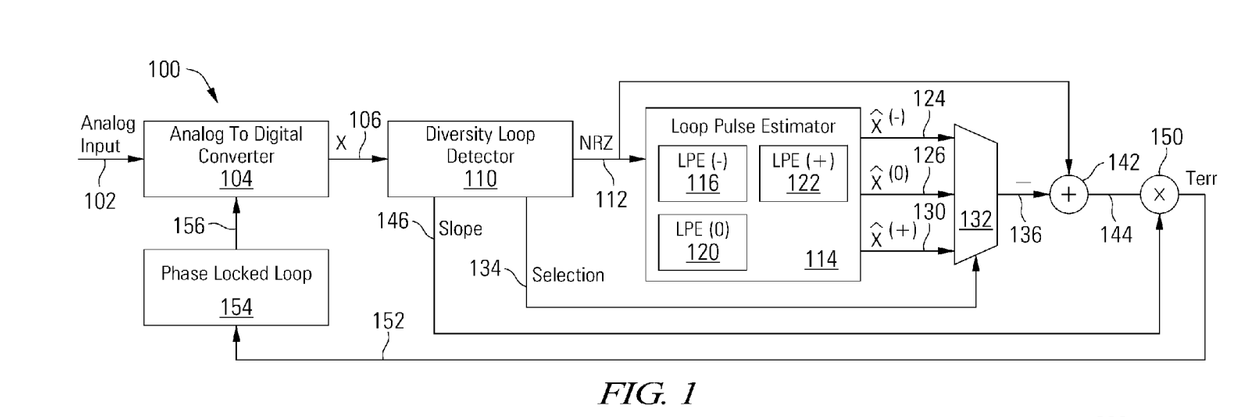
FIG. 1 is a block diagram of a timing error detector with diversity loop detector decision feedback in accordance with some embodiments of the present invention.

Turning to FIG. 1, a timing error detector 100 with diversity loop detector decision feedback is shown in accordance with some embodiments of the present invention. An analog signal 102 is provided to an analog to digital converter 104. In some cases, analog signal 102 is derived from a read/write head assembly in a magnetic storage medium. In other cases, analog signal 102 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which analog signal 102 may be derived.

Analog to digital converter 104 converts analog signal 102 into a corresponding series of digital samples 106, or X samples. Analog to digital converter 104 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In some embodiments, the phase and frequency of the sampling are controlled by a clock signal 156 from a phase locked loop 154.

Digital samples 106 are provided to a diversity loop detector 110, which applies a data detection algorithm to each of a number of phase shifted versions of the digital samples 106, resulting in a detected output 112, also referred to as hard decisions or non-return to zero (nrz) data. In some embodiments of the present invention, diversity loop detector 110 is a soft-input hard-output detector such as, but not limited to, a Viterbi algorithm data detector circuit or a maximum a posteriori (MAP) data detector circuit as are known in the art. In some embodiments, diversity loop detector 110 applies equalization processes with different phase offsets to the digital samples 106 to produce the phase shifted version of the digital samples 106, each of which are then passed through a data detector to yield multiple detected outputs at the different phase offsets. A selection circuit in the diversity loop detector 110 selects the data detector which yields the best results, and outputs the detected output from the selected data detector as detected output 112. The diversity loop detector 110 also outputs a selection signal 134, indicating the phase offset associated with the selected data detector, and a slope output 146, which carries the slope of the minimum accumulated state metric growth for the data detector circuits. In some embodiments, this slope is calculated by periodically sampling the state metric for one state in each of the data detectors, accumulating the growth or increase in each of those state metrics, selecting the detector with the lowest accumulated state metric growth and outputting the slope of the accumulated state metric growth for the selected detector.

A loop pulse estimation circuit 114 processes the detected output 112 from diversity loop detector 110 to estimate the channel bit response at the output of the analog to digital converter 104. The hard decision nrz in the detected output 112 from the diversity loop detector 110 is convolved with a loop pulse, a partial response target, in the diversity loop detector 110 to estimate the channel response and provide ideal digital samples 2. The ideal digital samples 2 can be used in generating error signals for feedback loops such as, but not limited to, the timing loop, a gain loop and DC loop. The loop pulse estimator 114 may be any circuit known in the art that is capable convolving digital samples 106 with partial response target. Based upon the disclosure provided herein, one of ordinary skill in the art will recognize a variety of loop pulse estimation circuits that may be used in relation to different embodiments of the present invention.

In some embodiments, the loop pulse estimator 114 includes a number of separate loop pulse estimation circuits (e.g., 116, 120, 122), one for each of the phase offsets in the diversity loop detector 110, each convolving the detected output 112 with a partial response target having a different one of the phase offsets and yielding multiple ideal digital samples $\hat{x}^{(-)}$ 124, $\hat{x}^{(0)}$ 126 and $\hat{x}^{(+)}$ 130, one for each phase offset. The selection signal 134 is used to select the ideal digital samples $\hat{x}^{(-)}$ 124, $\hat{x}^{(0)}$ 126 or $\hat{x}^{(+)}$ 130 in multiplexer 132 so that the same selected phase offset is applied in the detected output 112 and the selected ideal digital samples $\hat{x}$ 136. In some other embodiments, the loop pulse estimator 114 includes a single loop pulse estimation circuit, with is configured to use a partial response target having the same phase offset as that selected in diversity loop detector 110.

The ideal digital samples $\hat{x}$ 136 are subtracted from detected output 112 in adder 142, yielding an intermediate timing error signal 144. (Adder 142, which "adds" the negative of ideal digital samples $\hat{x}$ 136 to detected output 112, may also be referred to as a subtraction circuit.) The intermediate timing error signal 144 is multiplied by the slope 146 of the accumulated state metric growth for the selected detector in scaling circuit or multiplier 150, yielding a timing error signal 152. In some embodiments, the slope 146 is squared before multiplying with the intermediate timing error signal 144 to yield the timing error signal 152. The timing error signal 152 is provided to the phase locked loop 154 which regulates the analog to digital converter 104 to correct timing errors in the sampling of the analog signal 102. The loop pulse estimator 114, multiplexer 132, subtraction circuit 142, and multiplier 150 are also referred to herein collectively as a timing error calculation circuit according to some embodiments of the invention.

When the diversity loop detector 110 switches from one phase offset to another based on the detector decisions, the timing error is most likely greater than half the difference between the two phase offsets. By basing the timing error detection on the phase offset selected by the diversity loop detector 110, timing errors can be rapidly and accurately detected.

Figure 2:
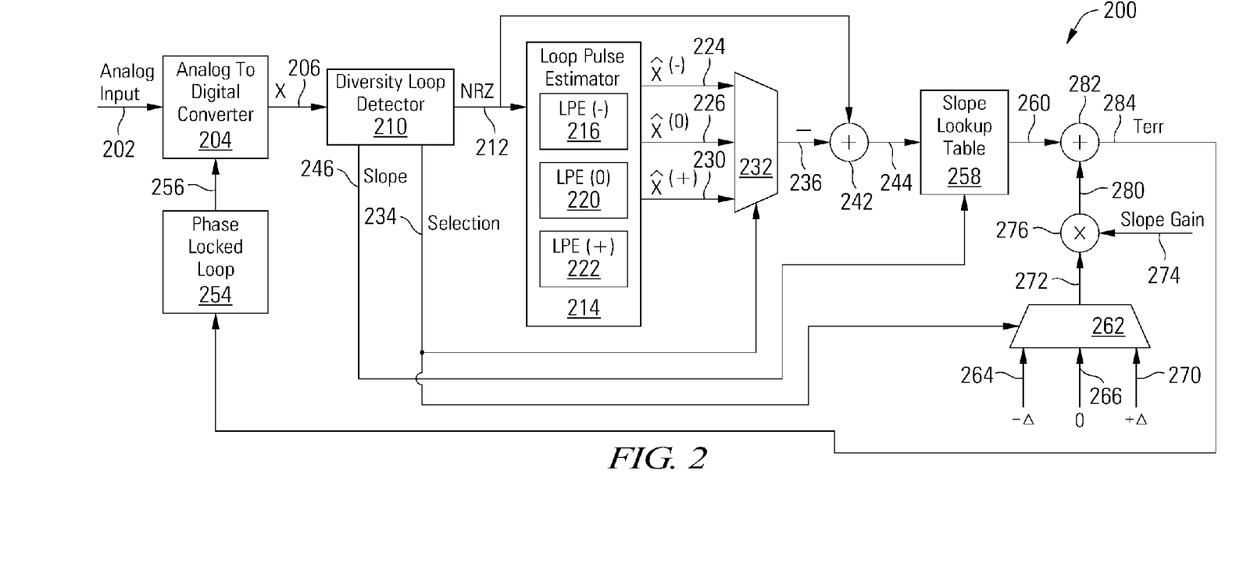
FIG. 2 is a block diagram of a timing error detector with diversity loop detector decision feedback with a slope lookup table and a timing error correction term in accordance with some embodiments of the present invention.

Turning to FIG. 2, a timing error detector 200 with diversity loop detector decision feedback is shown in accordance with some embodiments of the present invention. An analog signal 202 is provided to an analog to digital converter 204. In some cases, analog signal 202 is derived from a read/write head assembly in a magnetic storage medium. In other cases, analog signal 202 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which analog signal 202 may be derived.

Analog to digital converter 204 converts analog signal 202 into a corresponding series of digital samples 206, or X samples. Analog to digital converter 204 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In some embodiments, the phase and frequency of the sampling are controlled by a clock signal 256 from a phase locked loop 254.

Digital samples 206 are provided to a diversity loop detector 210, which applies a data detection algorithm to each of a number of phase shifted versions of the digital samples 206, resulting in a detected output 212, also referred to as hard decisions or non-return to zero (nrz) data. In some embodiments of the present invention, diversity loop detector 210 is a soft-input hard-output detector such as, but not limited to, a Viterbi algorithm data detector circuit or a maximum a posteriori (MAP) data detector circuit as are known in the art. In some embodiments, diversity loop detector 210 applies equalization processes with different phase offsets to the digital samples 206 to produce the phase shifted version of the digital samples 206, each of which are then passed through a data detector to yield multiple detected outputs at the different phase offsets. A selection circuit in the diversity loop detector 210 selects the data detector which yields the best results, and outputs the detected output from the selected data detector as detected output 212. The diversity loop detector 210 also outputs a selection signal 234, indicating the phase offset associated with the selected data detector, and a slope output 246, which carries the slope of the minimum accumulated state metric growth for the data detector circuits. In some embodiments, this slope is calculated by periodically sampling the state metric for one state in each of the data detectors, accumulating the growth or increase in each of those state metrics, selecting the detector with the lowest accumulated state metric growth and outputting the slope of the accumulated state metric growth for the selected detector.

A loop pulse estimation circuit 214 processes the detected output 212 from diversity loop detector 210 to estimate the channel bit response at the output of the analog to digital converter 204. The hard decision nrz in the detected output 212 from the diversity loop detector 210 is convolved with a loop pulse, a partial response target, in the diversity loop detector 210 to estimate the channel response and provide ideal digital samples $\hat{x}$. The ideal digital samples $\hat{x}$ can be used in generating error signals for feedback loops such as, but not limited to, the timing loop, a gain loop and DC loop. The loop pulse estimator 214 may be any circuit known in the art that is capable convolving digital samples 206 with partial response target. Based upon the disclosure provided herein, one of ordinary skill in the art will recognize a variety of loop pulse estimation circuits that may be used in relation to different embodiments of the present invention.

In some embodiments, the loop pulse estimator 214 includes a number of separate loop pulse estimation circuits (e.g., 216, 220, 222), one for each of the phase offsets in the diversity loop detector 210, each convolving the detected output 212 with a partial response target having a different one of the phase offsets and yielding multiple ideal digital samples $\hat{x}^{(-)}$ 224, $\hat{x}^{(0)}$ 226 and $\hat{x}^{(+)}$ 230, one for each phase offset. The selection signal 234 is used to select the ideal digital samples $\hat{x}^{(-)}$ 224, $\hat{x}^{(0)}$ 226 or $\hat{x}^{(+)}$ 230 in multiplexer 232 so that the same selected phase offset is applied in the detected output 212 and the selected ideal digital samples $\hat{x}$ 236. In some other embodiments, the loop pulse estimator 214 includes a single loop pulse estimation circuit, with is configured to use a partial response target having the same phase offset as that selected in diversity loop detector 210.

The ideal digital samples $\hat{x}$ 236 are subtracted from detected output 212 in adder 242, yielding an intermediate timing error signal 244. The intermediate timing error signal 244 is provided to a scaling circuit or slope lookup table 258 which looks up the value of a second intermediate timing error signal 260 based on the intermediate timing error signal 244 and the slope 246. In some embodiments, the slope lookup table 258 stores pre-calculated values for each value of the intermediate timing error signal 244, multiplied by the square of the slope 246.

In some embodiments, the timing error signal 284 is calculated by adding a slope gain correction term 280 to the second intermediate timing error signal 260. The slope gain correction term 280 is calculated by multiplying the selected phase offset 272 by a slope gain 274 in multiplier 276. In some embodiments, the slope gain 274 is a gain factor associated with the current slope for the selected phase offset 272. The selected phase offset 272 is provided in some embodiments by multiplexer 262 which selects one of the phase offsets −Δ 264, 0 266 and +Δ 270, based on the selection 234. The timing error signal 284 is provided to the phase locked loop 254 which regulates the analog to digital converter 204 to correct timing errors in the sampling of the analog signal 202. The loop pulse estimator 214, multiplexer 232, subtraction circuit 242, slope lookup table 258, and slope gain multiplexer 262, multiplier 276 and adder 282 are also referred to herein collectively as a timing error calculation circuit according to some embodiments of the invention.

Figure 3:
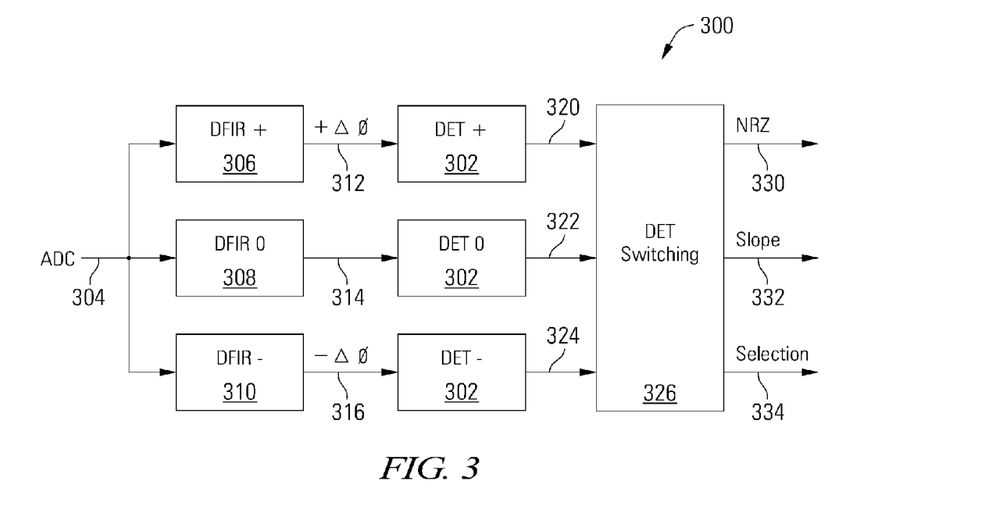
FIG. 3 is a block diagram of a diversity loop detector that may be used in some embodiments of a timing error detector in accordance with some embodiments of the present invention.

Turning to FIG. 3, a diversity loop detector 300 is shown that may be used in some embodiments of a timing error detector in accordance with some embodiments of the present invention. This and other embodiments of a diversity loop detector 300 which may be used in place of diversity loop detectors 110 and 210 are disclosed in U.S. patent application Ser. No. 13/741,482, filed Jan. 15, 2013 for "A DIVERSITY LOOP DETECTOR WITH COMPONENT DETECTOR SWITCHING", which is incorporated herein for all purposes. In some embodiments, the diversity loop detector 300 is implemented in a read channel system. For example, the diversity loop detector 300 can be implemented in/with a front end loop of a read channel system. The diversity loop detector 300 includes a number of component detectors 302, such as, but not limited to, three component detectors 302, as shown in FIG. 1. A digital input 304 is provided to a corresponding number of equalizer circuits 306, 308, 310, which apply an equalization algorithm to digital input 304 to yield equalized outputs 312, 314, 316. In some embodiments of the present invention, equalizer circuits 306, 308, 310 are digital finite impulse response filter circuits as are known in the art. Based upon the disclosure provided herein, one of ordinary skill in the art will recognize a variety of equalizer circuits that may be used in relation to different embodiments of the present invention. In some embodiments, equalizer circuits 306, 308, 310 are provided with different tap coefficients to apply different phase offsets to equalized outputs 312, 314, 316, yielding equalized outputs 312, 314, 316 with different phase offsets, one with nominal phase, one 312 with a positive phase offset and one 316 with a negative phase offset. In other embodiments, the digital input 304 is provided with multiple different sampling phases, and in some of these embodiments, the equalizer circuits 306, 308, 310 have identical tap coefficients.

Data detector circuits 302 are operable to apply a data detection algorithm to the equalized outputs 312, 314, 316. In some embodiments, data detector circuits 302 are soft-in hard-out Viterbi algorithm data detector circuits as are known in the art. In other embodiments of the present invention, data detector circuits 302 are maximum a posteriori data detector circuits as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention.

The data detector circuits 302 yield detected values 320, 322, 324 of equalized outputs 312, 314, 316, also referred to herein as non-return to zero or nrz data, to a detector switching or selection circuit 326. The switching circuit 326 is operable to select between the detected values 320, 322, 324 from the data detector circuits 302, selecting the data detector circuit 302 with the lowest timing error, or best phase. The switching circuit 326 examines the state matrix for one state from all the data detector circuits 302 over a period of time. In some embodiments, the state metrics for the one state are sampled every N bits, such as, but not limited to, every 100 bits. The previous state metric values are subtracted, in a manner analogous to calculating a mean squared error. By doing this for each of the data detector circuits 302, each of which has a different timing offset, an indication is obtained of the metric associated with the best path through the detector trellis under the assumption of each different timing offset. The detector with the lowest accumulated error over the last N bits is selected. This is also referred to herein as the slope of the minimum accumulated state metric growth.

The switching circuit 326 yields the selected nrz output 330 from the selected one of the data detector circuits 302, along with a slope output 332 that indicates the slope of the minimum accumulated state metric growth for the data detector circuits 302, and a selection output 334 that indicates which of the data detector circuits 302 is currently selected.

Figure 4:
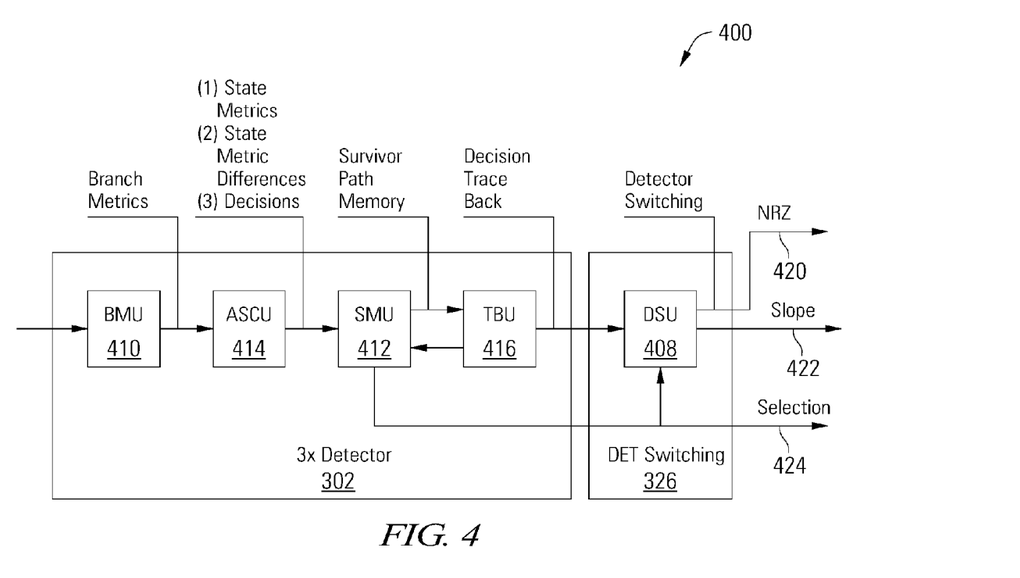
FIG. 4 is a block diagram of a component detector and a selection circuit of the diversity loop detector of FIG. 2 in accordance with some embodiments of the present invention.

Turning to FIG. 4, one of the component data detector circuits 302 and the switching circuit 326 of the diversity loop detector 300 are shown. The component data detector circuits 302 are configured for generating nrz outputs (e.g., hard decision outputs) based upon the received inputs (e.g., 312, 314, 316) and providing them to the switching circuit 326. The switching circuit 326 includes a detector switching unit (DSU) 408 configured to selecting the output of one of the component data detector circuits 302 for a jointly better decision.

In some embodiments, a 4-state trellis of the diversity loop detector 300 is generated based on a 3-tap loop detector target. In some embodiments, branch outputs are calculated from linear expansion of channel target taps, or error event-based calibrated channel ideas from an independent block.

In some embodiments, each of the component data detector circuits 302 includes a branch metrics unit (BMU) 410. In some embodiments, the branch metrics unit 410 (e.g., 4T Equivalent Trellis), at full-rate, takes one input (e.g., sample "c") and generates one output:

$$B_k([ab]c) = (y_k - \hat{y}^{[ab] \to [bc]})^2$$

where "a" is the earlier bit (e.g., most significant bit (MSB)) and "c" is the most recent bit (e.g., least significant bit (LSB)). There are 8 branch metrics at time "k". At quarter-rate, the branch metrics unit 410 takes four inputs (sample "cdef") and generates four outputs:

$$B_k([ab]cdef) = B_k([ab]c) + B_k([bc]d) + B_k([cd]e) + B_k([de]f)$$

In some embodiments, there are 64 branch metrics for one quarter-rate clock.

The branch metrics unit 410 is configured to pre-select one of the four parallel branches connection states. For example, 64 branches may be reduced to 16 branches in the 4T trellis. In some embodiments, to provide such pre-selection, the branch metrics unit 410 is configured with sixteen 4-way comparators. In some embodiments, each 4T branch metric is associated with two pre-selected hard decision outputs for sample "c" and "d", which are memorized and put to a path metric buffer by a survivor path metric unit (SMU) 412 of the component data detector circuit 302:

$$B_k([ab]\ldots ef) = \min\{B_k([ab]00ef), B_k([ab]01ef), B_k([ab]10ef), B_k([ab]11ef)\}$$

In some embodiments, a state metric update is provided via the following:

$$S_k(ef) = \min\{S_{k-4}(00) + B_k([00]\ldots ef), S_{k-4}(01) + B_k([01]\ldots ef), S_{k-4}(10) + B_k([10]\ldots ef), S_{k-4}(11) + B_k([11]\ldots ef)\}$$

In some embodiments, each component data detector circuit 302 includes an add-compare-select unit (ASCU) 414 connected to the branch metrics unit 410 and configured for receiving an output (e.g., branch metrics output) from the branch metrics unit 410. The add-compare-select unit 414 is configured for generating an output based upon the received output from the branch metrics unit 410 and the state metrics from the previous cycle. The output of the add-compare-select unit 414 includes data regarding: state metrics, state metric differences and decisions. In some embodiments, the add-compare-select unit 414 is a 4T add-compare-select unit including four 2-way adders and one 4-way comparator. The add-compare-select unit 414 selects one of four incoming branches to update the status metric for a given state. In some embodiments, each component data detector circuit 302 includes four add-compare-select units. To prevent state metric accumulator overflow due to non-negative branch metrics, if the maximum difference between 2-way comparisons is bounded, then modulo $2^X$ arithmetic is implemented as:

$$2^x > 2 \cdot \text{Bound}$$

The comparison of A and B is always correct when calculating the subtraction D=A−B with x bits. When the MSB of D is 1, A<B and, when MSB of D is 0, A is greater than or equal to B. All calculations that involve state metrics, including addition and subtraction comparisons, are modulo-based calculations, so the roll-over is consistent. In some embodiments, for the 4-state trellis, the bound is proved theoretically via the following:

$$\text{Bnd}_{SM,4T} = 2\text{Bnd}_{BM,4T}$$

In some embodiments, as mentioned above, each component data detector circuit 302 includes a survivor path metric unit 412 receives an output from the add-compare-select unit 414, including data regarding state metrics, state metric differences and decisions. In some embodiments, the survivor path metric unit 412 is configured for storing survivor path data (e.g., a surviving path for each trellis state during a time window). In some embodiments, the survivor path metric unit 412 includes a first buffer (e.g., hard decision (HD) buffer) which is configured for storing hard decision bits corresponding to the winning branch merging to a state. For example, the length TBL of the hard decision buffer is 12 samples.

A trace back unit (TBU) 416 receives data (e.g., survivor path memory data) from the survivor path metric unit 412. In response to obtaining data from the survivor path metric unit 412, the trace back unit 416 is configured for generating an output and transmitting it to the survivor path metric unit 412, the output being received by the survivor path metric unit 412. In some embodiments, the survivor path metric unit 412 is configured for determining (e.g., memorizing) the output of the add-compare-select unit 414 and the trace back unit 416. Content in buffers of the survivor path metric unit 412 is used in (e.g., obtained/retrieved by) the trace back unit 416. In some embodiments, based upon the data obtained from the survivor path metric unit 412, the trace back unit 416 of each component data detector circuit 302 is configured for generating a further output (e.g., a decision trace back output, hard decision output) and transmitting the decision trace back output (e.g., hard decision output) from the component data detector circuit 302 to the detector switching unit 408. In some embodiments, a register exchange method is provided for and/or implemented by the survivor path metric unit 412. For example, the survivor path metric unit 412 stores values of decisions of the add-compare-select unit 414 directly, so the trace back unit 416 is simply taking the hard decision directly. In some embodiments, at time k, the 4 state metrics of each component detector are compared. The state with the minimum accumulated state metric is then chosen as the winning state. The trace back unit 416 begins trace back from this trellis state to k−TBL+1 time instance to determine the hard outputs of each component data detector circuit 302.

The trace back unit 416 compares the updated state metrics (e.g., the four updated state metrics) for a component data detector circuit 302, finds the minimum state, then traces back from that state to generate the final hard decision for the data detector circuit 302, which will be provided to a hardout buffer of the survivor path metric unit 412.

In some embodiments, as mentioned above, the switching circuit 326 includes a detector switching unit 408 configured for receiving the output (e.g., decision trace back output, a hard decision output) from the trace back unit 416 and, based upon the output received from the trace back unit 416, generating and transmitting a hard decision or nrz output 420. In some embodiments, the detector switching unit 408 is configured for taking a minimum state metric value (e.g., a result from a four-way comparison performed by the trace back unit 416) and buffering it in a sliding buffer for slope calculation, yielding the slope value 422. The detector switching unit 408 also yields a selection output 424, indicating which of the data detector circuits 302 is selected.

As mentioned above, the detector switching unit 408 is configured for selecting the output of one of the component data detector circuits 302 (e.g., performing detector switching), utilizing any one or more of a variety of possible switching detector methods. For example, the detector switching unit 408 may implement minimum state metric (SM) switching, periodic state likelihood reset, cross-over connections among detectors or differentiator-based switching. The detector switching methods which may be implemented by the detector switching unit 408 of the switching circuit 326 are discussed in further detail below.

The switching circuit 326 is configured for implementing any one of a number of methods for promoting fast switching amongst the component data detector circuits 302, including but not limited to periodic state likelihood reset, slope-based switching, and cross-over connections among detectors.

In some embodiments, state likelihood reset is implemented by the switching circuit 326 for switching amongst the component data detector circuits 302. In embodiments in which state likelihood reset is implemented by the diversity loop detector 300, the minimum (min) state of each of the component data detector circuits 302 is reset to zero periodically. The relative ranking of state likelihood is maintained within data detector circuits 302.

In some embodiments, cross-over connections among detectors is implemented by the switching circuit 326 for switching amongst the component data detector circuits 302. In embodiments in which cross-over connections (e.g., cross-over bridge) amongst detectors is implemented by the diversity loop detector 300, periodic cross-over with a state metric (SM) penalty occurs. In some of these embodiments, the cross-over connection is on the Viterbi trellis.

In some embodiments, slope-based switching (e.g., sectional slope-based switching) is implemented by the switching circuit 326 for switching amongst the component data detector circuits 302. Switching based on the slope of minimum accumulated state metric growth promotes accurate and fast switching in case of a transition phase offset. Because slope-based switching doesn't affect the critical data path, there are minimal delays and fixed point modulo arithmetic still holds, thereby promoting ease of parameter optimization. Slope-based switching implements multiple (e.g., three) sliding window minimum state metric buffers, each of which buffers one minimum state metric value every N samples.

Figure 5:
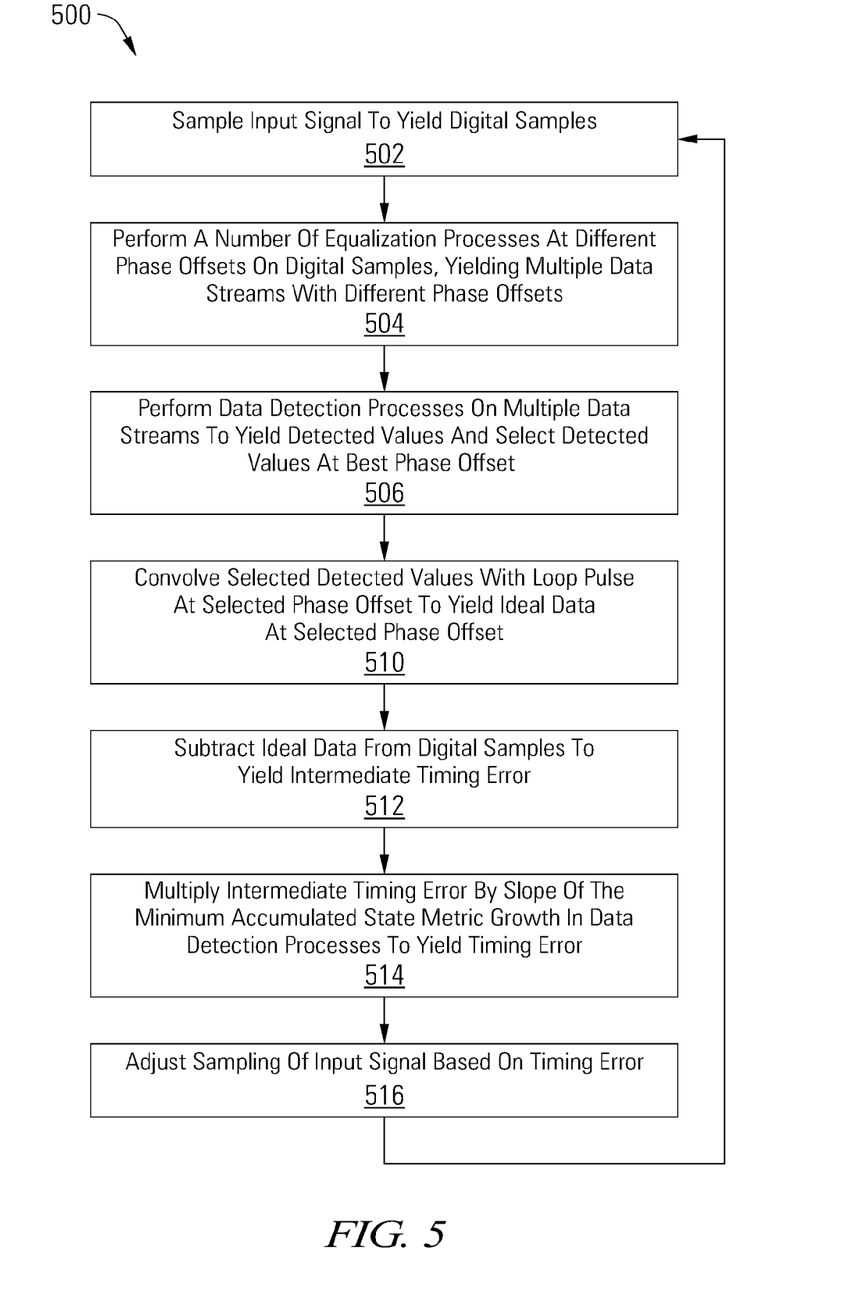
FIG. 5 depicts a flow diagram of an operation for detecting timing errors using decision feedback from a diversity loop detector in accordance with some embodiments of the present invention.

Turning to FIG. 5, a flow diagram 500 shows an operation for detecting timing errors using decision feedback from a diversity loop detector in accordance with some embodiments of the present invention. Following flow diagram 500, an input signal is sampled to yield digital samples. (Block 502) A number of equalization processes are performed at different phase offsets on the digital samples, yielding multiple data streams with different phase offsets. (Block 504) In some embodiments, the different phase offsets are applied by adapting the tap coefficients of digital finite impulse response filters performing the equalization such that the tap coefficients apply different phase offsets while filtering. In some other embodiments, multiple versions of the digital samples are provided with different phase offsets prior to equalization. Data detection processes are performed on the multiple equalized data streams to yield detected values, and detected values with the best phase offset are selected. (Block 506) In some embodiments, the data detection processes each apply the same soft-in hard-out Viterbi detection algorithm to each of the equalized data streams. The selected detected values are convolved with a loop pulse target with the same phase offset as that of the selected detected values, yielding ideal data at the selected phase offset. (Block 510) In some embodiments, multiple loop pulse estimation circuits are used, one for each of the phase offsets of the multiple data streams, and the loop pulse estimation output is selected which was generated at the selected phase offset. In some other embodiments, a single loop pulse estimation circuit is used and is reconfigured for the selected phase offset each time a different phase offset is selected. The ideal data is subtracted from the digital samples to yield an intermediate timing error. (Block 512) The intermediate timing error is multiplied by the slope of the minimum accumulated state metric growth in the data detection processes to yield the timing error. (Block 514) In some embodiments, the multiplication is performed using a lookup table to look up a stored product of the intermediate timing error and the slope. Any suitable granularity for slope values can be used, such as, but not limited to, five possible slope values (−2, −1, 0, 1, 2). In some other embodiments, the multiplication is performed using a multiplier circuit. In some embodiments, a slope gain value for the current slope and the selected phase offset is added to the timing error to correct for different gain values in the timing error based on the phase offset and slope. The sampling of the input signal is adjusted based on the timing error. (Block 516)

Figure 6:
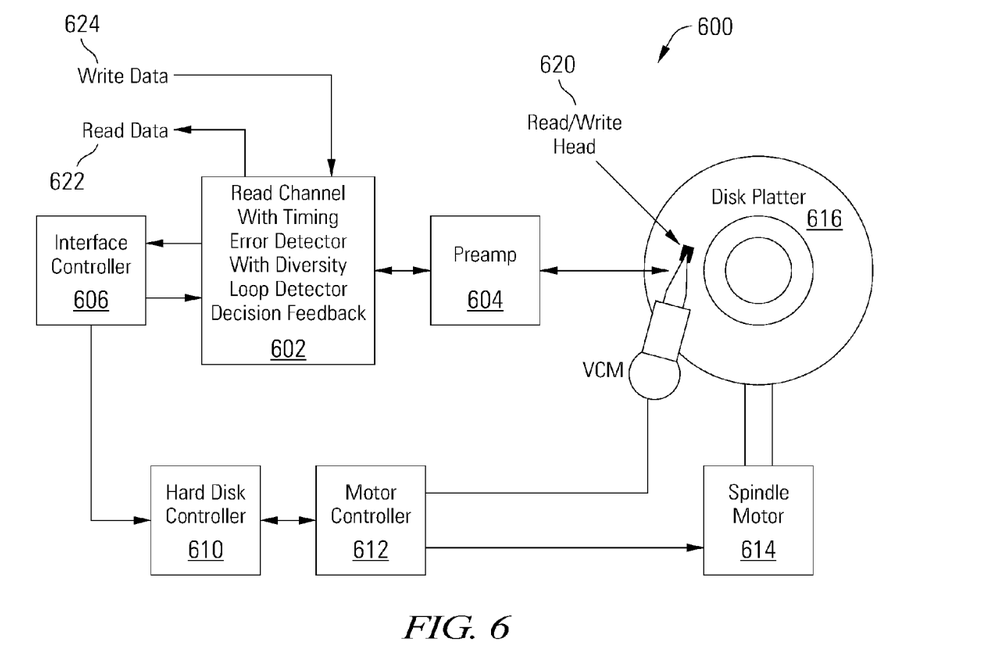
FIG. 6 depicts a storage system including a timing error detector with diversity loop detector decision feedback in accordance with some embodiments of the present invention.
Figure 7:
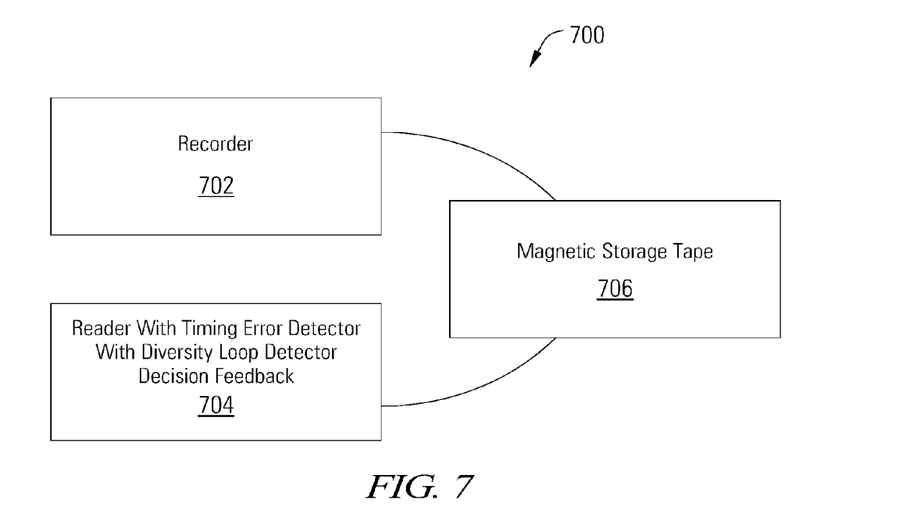
FIG. 7 depicts a tape storage system including a timing error detector with diversity loop detector decision feedback in accordance with some embodiments of the present invention.

Although the timing error detection with diversity loop detector decision feedback disclosed herein is not limited to any particular application, several examples of applications are disclosed in FIGS. 6 and 7 that benefit from embodiments of the present invention. Turning to FIG. 6, a storage system 600 is illustrated as an example application of a timing error detector with diversity loop detector decision feedback in accordance with some embodiments of the present invention. The storage system 600 includes a read channel circuit 602 with a timing error detector with diversity loop detector decision feedback in accordance with some embodiments of the present invention. Storage system 600 may be, for example, a hard disk drive. Storage system 600 also includes a preamplifier 604, an interface controller 606, a hard disk controller 610, a motor controller 612, a spindle motor 614, a disk platter 616, and a read/write head assembly 620. Interface controller 606 controls addressing and timing of data to/from disk platter 616. The data on disk platter 616 consists of groups of magnetic signals that may be detected by read/write head assembly 620 when the assembly is properly positioned over disk platter 616. In one embodiment, disk platter 616 includes magnetic signals recorded in accordance with either a longitudinal or a perpendicular recording scheme.

In a typical read operation, read/write head assembly 620 is accurately positioned by motor controller 612 over a desired data track on disk platter 616. Motor controller 612 both positions read/write head assembly 620 in relation to disk platter 616 and drives spindle motor 614 by moving read/write head assembly 620 to the proper data track on disk platter 616 under the direction of hard disk controller 610. Spindle motor 614 spins disk platter 616 at a determined spin rate (RPMs). Once read/write head assembly 620 is positioned adjacent the proper data track, magnetic signals representing data on disk platter 616 are sensed by read/write head assembly 620 as disk platter 616 is rotated by spindle motor 614. The sensed magnetic signals are provided as a continuous, minute analog signal representative of the magnetic data on disk platter 616. This minute analog signal is transferred from read/write head assembly 620 to read channel circuit 602 via preamplifier 604. Preamplifier 604 is operable to amplify the minute analog signals accessed from disk platter 616. In turn, read channel circuit 602 decodes and digitizes the received analog signal to recreate the information originally written to disk platter 616. This data is provided as read data 622 to a receiving circuit. While processing the read data, read channel circuit 602 adjusts sampling timing using a timing error detector with diversity loop detector decision feedback. Such a timing error detector with diversity loop detector decision feedback may be implemented consistent with that disclosed in relation to FIGS. 1-4. In some cases, the timing error detection may be performed consistent with the flow diagram disclosed in relation to FIG. 5. A write operation is substantially the opposite of the preceding read operation with write data 624 being provided to read channel circuit 602. This data is then encoded and written to disk platter 616.

It should be noted that storage system 600 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 600, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 600 may be modified to include solid state memory that is used to store data in addition to the storage offered by disk platter 616. This solid state memory may be used in parallel to disk platter 616 to provide additional storage. In such a case, the solid state memory receives and provides information directly to read channel circuit 602. Alternatively, the solid state memory may be used as a cache where it offers faster access time than that offered by disk platted 616. In such a case, the solid state memory may be disposed between interface controller 606 and read channel circuit 602 where it operates as a pass through to disk platter 616 when requested data is not available in the solid state memory or when the solid state memory does not have sufficient storage to hold a newly written data set. Based upon the disclosure provided herein, one of ordinary skill in the art will recognize a variety of storage systems including both disk platter 616 and a solid state memory.

Turning to FIG. 7, a tape storage system 700 including a reader 704 with a timing error detector with diversity loop detector decision feedback is shown in accordance with some embodiments of the present inventions. Tape storage system 700 includes a recorder 702 that is operable to record encoded information on a magnetic storage tape 706 as is known in the art. The encoded data is read from magnetic storage tape 706 by reader 704. Reader 704 incorporates a timing error detector with diversity loop detector decision feedback, which may be implemented consistent with that disclosed in relation to FIGS. 1-4. In some cases, the timing error detection may be performed consistent with the flow diagram disclosed in relation to FIG. 5.

It should be noted that the various blocks discussed in the above application may be implemented in integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for timing error detection with diversity loop detector decision feedback. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for detecting timing errors, comprising:
an analog to digital converter circuit operable to convert an input signal into a series of digital samples;
a diversity loop detector comprising a plurality of data detectors operable to apply a data detection algorithm to a plurality of signals derived from the series of digital samples at different phase offsets, to select one of the phase offsets, and to yield a detected output with the selected phase offset, the diversity loop detector comprising a selection output operable to identify which of the plurality of data detectors in the diversity loop detector is selected, each of the plurality of data detectors comprising a soft-input hard-output detector, wherein the diversity loop detector is operable to select said one of the phase offsets that corresponds to one of the plurality of data detectors that has a lowest accumulated state metric growth; and a timing error calculation circuit operable to calculate a timing error of the analog to digital converter circuit based at least in part on the selected phase offset indicated by the selection output.

2. The apparatus of claim 1, the timing error calculation circuit comprising:

an ideal detected output calculator operable to estimate an ideal version of the detected output at the selected phase offset;

a subtraction circuit operable to subtract the ideal version of the detected output from the detected output to yield a difference; and a scaling circuit operable to scale the difference based on a slope output from the diversity loop detector.

3. The apparatus of claim 2, wherein the slope output carries a slope of an accumulated state metric growth for the selected phase offset in the diversity loop detector.

4. The apparatus of claim 2, wherein the ideal detected output calculator comprises a loop pulse estimation circuit operable to convolve the detected output with a partial response target at the selected phase offset.

5. The apparatus of claim 2, wherein the ideal detected output calculator comprises a plurality of loop pulse estimation circuits with partial response targets at each of the different phase offsets.

6. The apparatus of claim 5, wherein the ideal detected output calculator further comprises a selector operable to select an output of one of the plurality of loop pulse estimation circuits having the partial response target at the selected phase offset.

7. The apparatus of claim 2, wherein the scaling circuit comprises a multiplier operable to multiply the difference by a square of a slope value at the slope output.

8. The apparatus of claim 2, wherein the scaling circuit comprises a slope lookup table operable to yield a timing error signal based on the difference and a slope value at the slope output.

9. The apparatus of claim 2, the timing error calculation circuit further comprising a slope gain compensation circuit operable to add a correction term to the timing error.

10. The apparatus of claim 9, wherein the slope gain compensation circuit comprises a multiplier operable to multiply the selected phase offset by a slope gain value to yield the correction term and an adder operable to add the correction term to the timing error.

11. The apparatus of claim 1, further comprising a phase locked loop operable to generate a clock signal for the analog to digital converter based at least in part on the timing error.

12. The apparatus of claim 1, wherein the apparatus is implemented as an integrated circuit.

13. The apparatus of claim 1, wherein the apparatus is incorporated in a data storage device.

14. A method of detecting timing errors, comprising:
sampling an input signal to yield digital samples;
equalizing the digital samples with a plurality of different phase offsets to yield a plurality of data streams;
performing a data detection process on the plurality of data streams in a diversity loop detector comprising a plurality of data detectors, selecting one of the phase offsets based on the data detection process to yield detected data with the selected phase offset and outputting a selection indicator indicating which of the phase offsets is selected, wherein said plurality of data detectors comprises soft-in hard-out detectors configured to apply a data detection algorithm, the plurality of data detectors comprising detectors selected from the group consisting of Viterbi algorithm data detector circuits and maximum a posteriori data detector circuits, wherein the diversity loop detector is operable to select said one of the phase offsets that corresponds to one of the plurality of data detectors that has a lowest accumulated state metric growth; and calculating a sampling timing error based at least in part on the selected phase offset according to the selection indicator.

15. The method of claim 14, wherein calculating the sampling timing error comprises calculating an ideal version of the detected data, and wherein the ideal version is calculated based on the selected phase offset.

16. The method of claim 15, wherein calculating the ideal version comprises convolving the detected data with a partial response target with the selected phase offset.

17. The method of claim 15, wherein calculating the sampling timing error further comprises subtracting the ideal version from the detected data to yield a difference.

18. The method of claim 17, wherein calculating the sampling timing error further comprises scaling the difference to yield the sampling timing error.

19. The method of claim 18, wherein the scaling comprises multiplying the difference by a square of a slope of an accumulated state metric growth for the selected phase offset in the data detection process.

20. A storage system comprising:
a storage medium;
a read/write head assembly operable to read data on the storage medium and to yield an analog signal;
an analog to digital converter operable to generate a series of digital samples representing the analog signal;
a diversity loop detector comprising a plurality of data detectors operable to apply a data detection algorithm to a plurality of signals derived from the series of digital samples at different phase offsets, to select one of the phase offsets, and to yield a detected output with the selected phase offset, the diversity loop detector comprising a selection output operable to identify which of the plurality of data detectors in the diversity loop detector is selected, each of the plurality of data detectors comprising a soft-input hard-output detector configured to apply a data detection algorithm, wherein the diversity loop detector is operable to select said one of the phase offsets that corresponds to one of the plurality of data detectors that has a lowest accumulated state metric growth; and a timing error calculation circuit operable to calculate a timing error of the analog to digital converter circuit based at least in part on the selected phase offset indicated by the selection output, comprising:
an ideal detected output calculator operable to estimate an ideal version of the detected output at the selected phase offset;
a subtraction circuit operable to subtract the ideal version of the detected output from the detected output to yield a difference; and
a scaling circuit operable to scale the difference based on a slope output from the diversity loop detector.

* * * * *